Patented Dec. 2, 1930

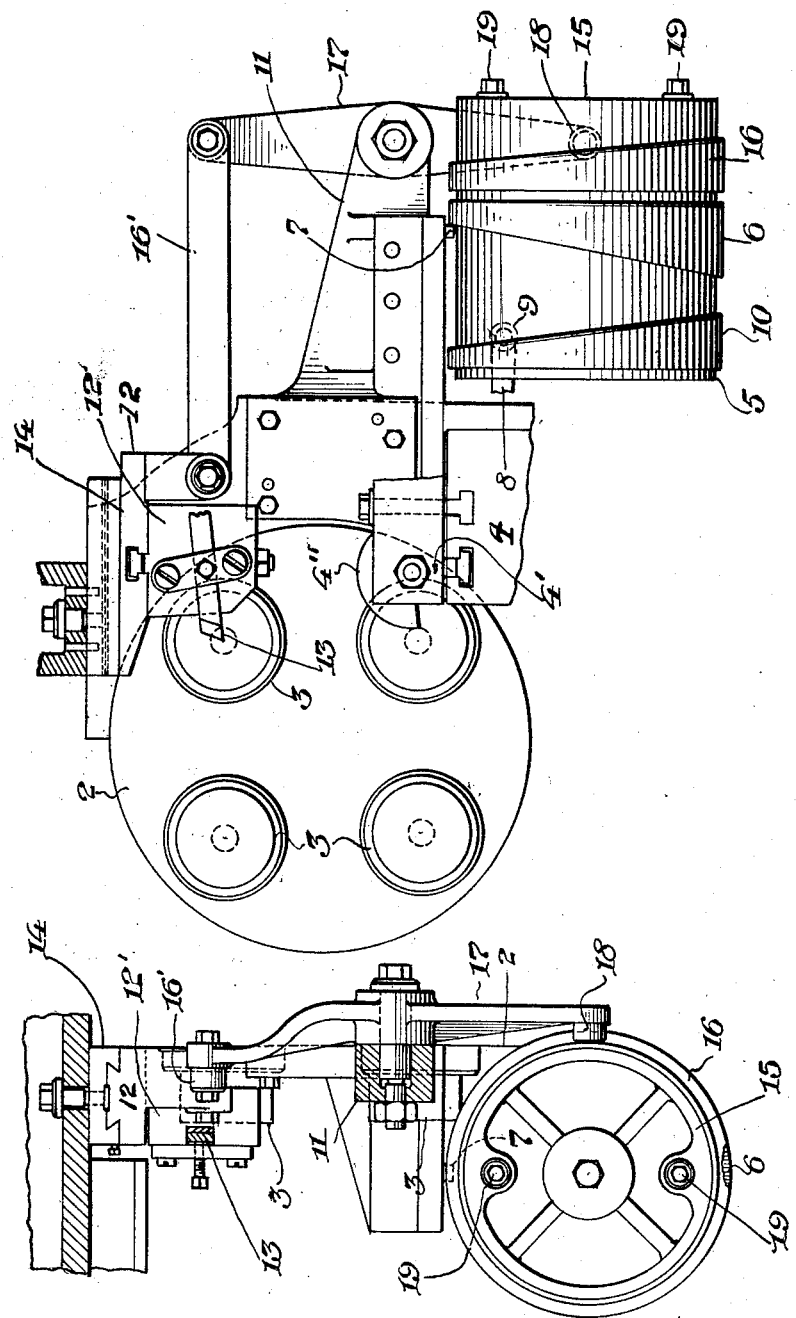

1,783,528

UNITED STATES PATENT OFFICE

OLOF ENOCH TROBECK, OF BERLIN, GERMANY, ASSIGNOR TO THE NATIONAL ACME COMPANY, OF CLEVELAND, OHIO, A CORPORATION OF OHIO

CROSS-TOOL SLIDE FOR MULTIPLE-SPINDLE AUTOMATIC SCREW MACHINES

Application filed July 21, 1928, Serial No. 294,355, and in Germany April 30, 1928.

This invention relates to multiple spindle automatic screw machines, more particularly to the cross tool slides thereof, the object of the invention being to provide an improved cross tool slide mechanism comprising a plurality of cross tool slides located one above another but supported and operated independently whereby the idle movements of the side working tools are reduced to a minimum, and which is simple in construction, efficient in use and can be easily applied without change to machines already in use, being particularly adapted for use in a four-spindle automatic screw machine of the "Gridley" type.

Heretofore in the use of the "Gridley" multiple spindle screw machines,—for instance, of the four-spindle type,—the main cross tool slides at opposite sides of the machine have at times also carried superimposed or supplemental top cross tool slides, one of which has been used for instance for machining the work in the third position of the work spindle, that is, the work carried by a work spindle located above that upon which one of the lower transverse tool slides operates,—but this organization required that the feeding speed for the lower tool and the upper tool of the transverse slides should be the same, this being satisfactory for certain operations but unsatisfactory for others. In other words, when the nature of the work required working distances of different lengths, this required that the combined slides have a movement equivalent to the longest working stroke with the result that there was a considerable idle movement in the operation of one of the tools when the work required a shorter stroke. Consequently, the working speed of the machine depended on the longest working stroke, but as the rate of feed for each tool is determined by the job to be done and by the material to be machined, which cannot be changed, it resulted that this idle or lost time just referred to materially reduced the production of the machine as compared with that which could be secured where each tool could have its full use without interfering with the work of the other.

Therefore, the object of the present invention is the provision of an improved crossslide mechanism in which the supplemental or top tool slide is not only supported but operated entirely independently of the bottom cross tool slide, so that each can have the required length of movement without interfering with the movement of the other. In other words, the top cross tool slide for carrying the tool for operating upon a piece of work carried by the work spindle in the third position thereof is mounted on a slide supported entirely free of and independently of the lower cross-slide carrying the tool for operating on the work of the spindle when in the fourth position thereof, which is immediately below that of the third position work spindle, and is also operated by means entirely independent of the means for operating the lower slide—with the result that each slide can have the desired length of movement, according to the work to be done, without interfering with or depending upon the movement of the other, thereby reducing the idle time and increasing the speed of the machine and so resulting in a considerable saving in the time necessary for the performance of work on the machine.

Thus by the improved mechanism herein described, the working stroke or speed of the top tool slide can be adjusted, as desired, according to the work to be operated upon entirely independently of the stroke or speed of the bottom slide,—so that, if desired, the tool of the top slide may have double the speed or stroke as compared with the tool of the bottom slide or vice versa, thus permitting each tool to be utilized to its full extent, thereby materially increasing the output of the machine.

Furthermore, the present improvement does away entirely with the cumbersome means heretofore used for supporting the top slide upon the bottom slide and, therefore, increases the accessibility to the machine between the spindles in the third and fourth positions thereof and permits a much greater variety in the arrangement of the tools.

Moreover, the precision of the machining operations is increased, since the means shown for operating the top slide permits better adjustments thereof, resulting, as stated, in a greater precision of movement; and, furthermore, the simplicity of the improvement is such that it can be readily adapted in a very simple manner to machines already built and in use without the necessity of modifying the machine in any way or without even sending the machine back to the manufacturer for the application of the present improvement thereto, since the same may be readily applied in the shop where the machine is in use.

Thus the advantages of the improvement are considerable and have materially resulted in the speeding up of the machines and the consequent loss of time in the performance of their work.

In the drawings accompanying and forming a part of this specification,—in which only so much of a "Gridley" four-spindle automatic screw machine is shown as is necessary to properly illustrate the invention—

Figure 1 is a partly transverse view of a four-spindle automatic screw machine illustrating the work spindles and a pair of slides at one side of the machine,—it being understood that a similar bottom cross tool slide is usually located at the opposite side of the machine and that this same form of top cross tool slide mechanism may also be applied at the opposite side of the machine, and Fig. 2 is an end view of Fig. 1, partly in section.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the usual four-spindle automatic screw machine of the "Gridley" type, the indexable work spindle carrier 2 is indexed by a suitable mechanism and is provided with four work spindles 3 which are rotated by suitable means. In Fig. 1 is shown, located at one side of the machine, an adjustable bottom, or lower cross tool slide 4 carrying a suitable tool holder 4' and tool 4'', this slide being usually gibbed to a part or framework of the machine and is reciprocated back and forth by a cam-carrying drum 5 driven in any suitable way from a suitable shaft carried by the machine. This drum carries the necessary and usual cams or straps 6 for shifting the bottom cross tool slide back and forth, these cams engaging a roller 7 carried by the bottom slide; and when a similar form of mechanism is used at the opposite side of the machine, the opposite bottom slide is operated by a draw-bar 8 having a roller 9 cooperating with similar cams or cam straps 10, whereby the opposite bottom slide is also shifted back and forth simultaneously.

Bolted to the housing of the spindle carrier 2 is a bracket or arm 11 for supporting the independent operating means of the top tool slide for operating upon the work in the third position thereof, and, as stated, a similar arm may be located at the opposite side of the machine, if desired. Located above this bracket is an adjustable top tool cross slide 12 carrying a suitable tool holder 12' provided with a tool 13, and, as will be observed, this top tool slide is supported or suspended, see Fig. 2, for reciprocating movement toward and from the work and for adjustment transversely of its sliding movement entirely independently of and free from the bottom tool slide, so that the movement of one is not imparted to the other, as has heretofore been the practice, and consequently the bottom tool can have a long or a short movement as compared with the movement of the top tool and vice versa,—resulting in a material saving in the idle movements of these tools and, of course, the machine as a whole.

The top tool slide 12 is dove-tailed or gibbed to a suitable complementary slide 14 secured to the work spindle housing and for operating this top tool slide entirely independently of the lower tool slide, the cam drum 5 is provided with an extension 15 formed preferably bolted to the cam drum 5 hereinbefore described. This extension carries suitable cams or cam straps 16 co-operating with a double-armed lever 17 pivotally secured to the bracket arm 11 hereinbefore described. The lower end of this double-armed lever 17 is provided with a roller 18 engaging the cams 16, while the upper end has pivotally connected thereto a link 16' pivotally connected to the top slide, whereby the top tool slide is shifted back and forth according to the length of stroke desired. As the drum extension may be fastened to the main drum by bolting it thereto by means of suitable bolts 19, it will be observed that this improved mechanism—comprising the bracket arm 11 bolted to the work spindle carrier housing, the supplemental drum 15 bolted to the main drum, and the double arm 17 with its link or rod connection 16' together with the top tool slide 12 and its supporting bracket 14 can be easily applied to machines already in use and provides a very simple top-slide operating mechanism supported entirely free of and operated entirely independently of the bottom slide, whereby the stroke of the top tool is entirely independent and free of that of the bottom tool, with the result that a considerable saving of time in the operation of these parts, as well as in the operation of the machine as a whole, is effected.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In an automatic multiple spindle screw machine having a work carrier provided with a plurality of work spindles and a sliding tool carrier relatively indexable and reciprocal, the combination of a sliding bottom cross tool slide, a sliding top cross tool slide supported independently of said bottom slide, and cam means located transversely of the machine for shifting both of said slides independently of each other.

2. In an automatic multiple spindle screw machine having a work carrier provided with a plurality of work spindles and a sliding tool carrier relatively indexable and reciprocal, the combination of a sliding bottom cross tool slide, a sliding top cross tool slide supported above said bottom slide and both shiftable in a horizontal plane, and cam means located transversely of the machine for shifting both of said slides independently of each other.

3. In a metal working machine having a work spindle housing, the combination of a sliding bottom cross tool slide, a sliding top cross tool slide supported independently of said bottom slide, independent cam means for shifting the tool slides independently of each other, and means attached to the side of the work spindle housing for supporting said top slide above the bottom slide and located over said cam means.

4. In an automatic multiple spindle screw machine having a work carrier provided with a plurality of work spindles and a sliding tool carrier relatively indexable and reciprocal, and having a sliding bottom cross tool slide and means for shifting it, the combination of a sliding top tool slide suspended in position above the bottom tool slide and both shiftable in a horizontal plane, and means independent of the shifting means for the bottom tool slide for shifting said top slide.

5. In an automatic multiple spindle screw machine having a work carrier provided with a plurality of work spindles and a sliding tool carrier relatively indexable and reciprocal, and having a sliding bottom cross tool slide, means for supporting it at the underside thereof for reciprocating movement, and means for shifting said slide, the combination of a sliding top tool slide, means for supporting it at the top side thereof, and means independent of the shifting means for the bottom tool slide for shifting said top slide.

6. In an automatic multiple spindle screw machine having a work carrier provided with a plurality of work spindles and a sliding tool carrier relatively indexable and reciprocal, and having a sliding bottom cross tool slide, means for supporting it at the underside thereof for reciprocating movement, and means for shifting said slide, the combination of a sliding top tool slide, means for supporting it at the top side thereof, and means independent of the shifting means for the bottom tool slide for shifting said top slide, each of said slides being adjustable transversely of their shiftable movements.

7. In a metal working machine having a work spindle housing, the combination of a pair of cross tool slides located one above the other for shiftable movement in a horizontal plane toward and from the work, a bracket bolted to the side of the work spindle housing for suspending the upper slide and extending laterally of the machine, a cam drum located transversely of the machine under said bracket and having cams thereon for shifting both of said slides, an arm pivoted to said bracket with its lower end in position to engage some of said cams, and a link connecting the upper end of said arm with the upper slide for shifting it independently of the lower slide.

8. In a metal working machine having a work spindle carrier, a sliding bottom cross tool slide, and means for shifting said slide, comprising a rotary cam-carrying drum located transversely of the machine, the combination of a sliding top tool slide supported independently of the bottom tool slide, an arm located at the side of the work spindle carrier, a supplemental cam drum secured to the main cam drum, and means operated thereby and connected with said arm and with the top tool slide for shifting it.

9. In a metal working machine having a work spindle carrier, a sliding bottom cross tool slide, and means for shifting said slide, comprising a rotary cam-carrying drum, the combination of a sliding top tool slide supported independently of the bottom tool slide, an arm located at the side of the work spindle carrier, a supplemental cam drum secured to the main cam drum, means operated thereby and connected with said arm and with the top tool slide for shifting it and comprising a double-armed lever pivotally connected to said arm, and a link pivotally connecting it with said top slide.

10. In a metal working machine having a work spindle housing, the combination of a pair of cross tool slides located one above the other for shiftable movement in a horizontal plane toward and from the work and also supported for adjustment axially of the work, a bracket bolted to the side of the work spindle housing for suspending the upper slide and extending laterally of the machine, a cam drum located transversely of the machine under said bracket and having cams thereon for shifting both of said slides, an arm pivoted to said bracket with its lower end in position to engage some of said cams, and a link connecting the upper end of said arm with the upper slide for shifting it independently of the lower slide.

11. In a metal working machine having a work spindle carrier provided with a plurality of work spindles, the combination of a pair of sliding cross tool slides, one located and spaced above the other, and means for independently operating said slides whereby the movement of one is independent of the movement of the other, said means comprising a cam drum located transversely of the machine and having independent cam-formed means for operating said slides.

12. In a metal working machine having a work spindle carrier provided with a plurality of work spindles, the combination of a pair of sliding cross tool slides shiftable in a horizontal plane, one located and spaced above the other, means for independently operating said slides whereby the movement of one is independent of the movement of the other, said means comprising a cam drum located transversely of the machine and having independent cam-formed means for operating said slides, and a lever system between said cam drum and top slide.

13. In a metal working machine having a work spindle housing, the combination of a sliding bottom cross tool slide, a sliding top cross tool slide supported independently of said bottom slide, independent cam means for shifting the tool slides independently of each other, and means attached to the side of the work spindle housing for supporting said top slide above the bottom slide and located over said cam means and having a laterally-extending arm and means carried adjacent to the outer end thereof and co-operating with one of the cam means for shifting the top slide.

14. In a metal working machine having a work spindle carrier provided with a plurality of work spindles, the combination of a pair of sliding cross tool slides, one supported adjacent to one of the work spindles and the other suspended, adjacent to another work spindle, said slides being spaced apart and independent of each other, and means for shifting said slides independently of each other and comprising a main cam drum located transversely of the machine, a supplemental cam drum secured thereto, and a lever system connected with the supplemental cam drum and the top tool slide for shifting it independently of the bottom tool slide.

15. A top tool cross slide adapted for attachment to metal working machines having a spindle carrier carrying a plurality of work spindles, and comprising a supporting bracket adapted for attachment to a part of the machine, a sliding top slide carried thereby, a cam-carrying drum adapted for attachment to a cam drum shifting a sliding bottom tool slide, an arm also adapted for attachment to the machine, and means carried by said arm and operated by said first cam drum for shifting the top slide.

16. In a metal working machine having a sliding bottom cross tool slide, a rotary cam-carrying drum located transversely of the machine for shifting said slide, a draw bar also actuated by said drum for shifting a similar bottom cross tool slide, a sliding top tool slide supported independently of the bottom tool slide, and independent means operated from said cam means for shifting the top tool slide.

17. In a metal working machine having a work spindle carrier housing, the combination of a sliding bottom cross tool slide built into the machine, a sliding top cross tool slide supported independently of the bottom slide and built independently of the machine and readily attachable to the side of the work spindle housing, and independent cam means for shifting the tool slides independently of each other.

Signed at Berlin, Germany, this 6th day of July, 1928.

OLOF ENOCH TROBECK.